March 26, 1968  W. J. GILLMAN  3,374,553
CLINKER COOLER GRATE PLATES
Filed July 16, 1965　　　　　　　　　　　　　　2 Sheets-Sheet 1
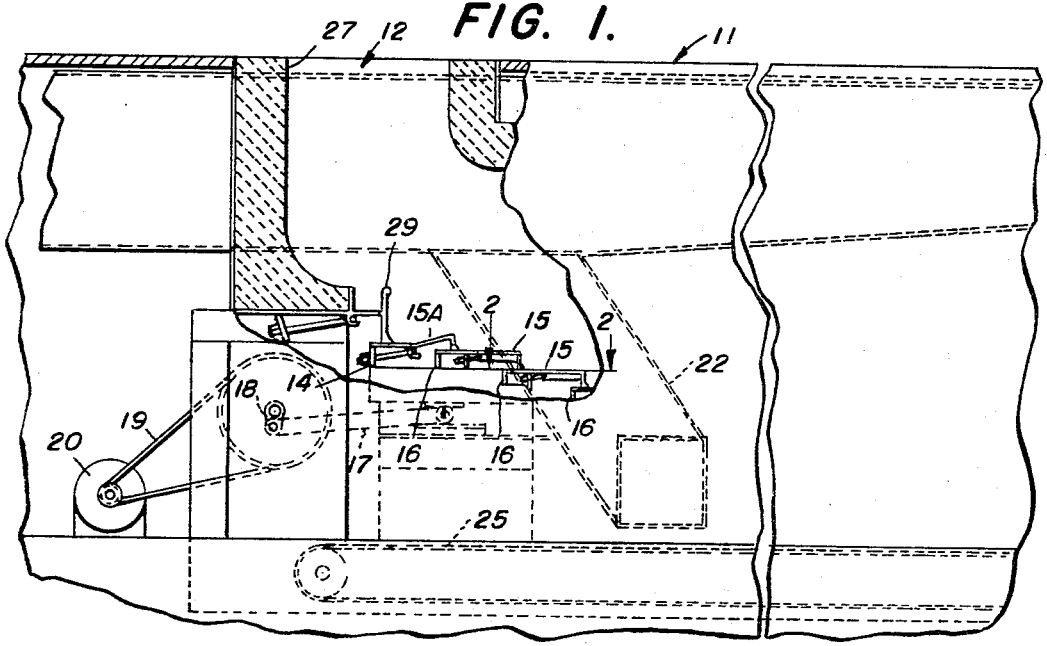
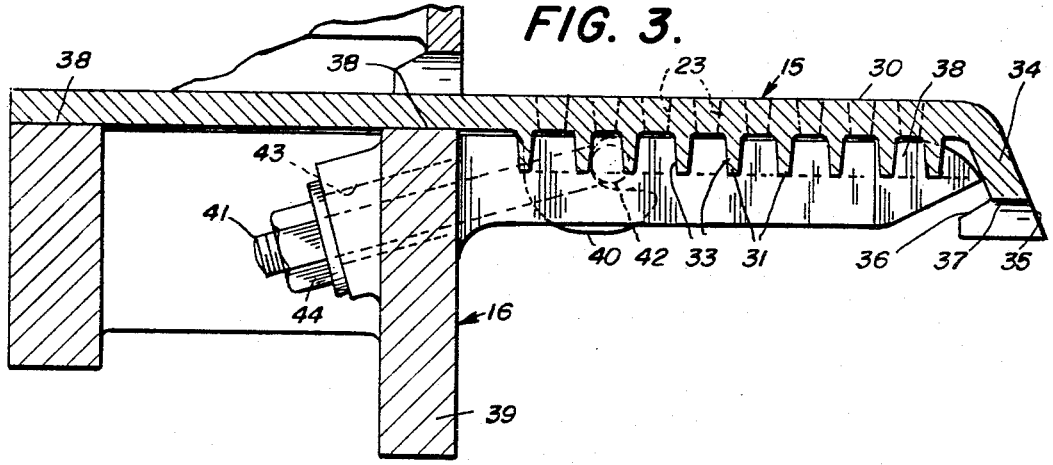
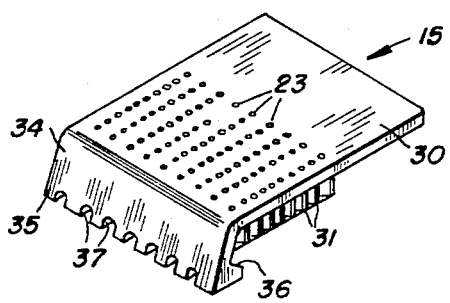
INVENTOR
WILLIAM J. GILLMAN
BY
ATTORNEY March 26, 1968  W. J. GILLMAN  3,374,553
CLINKER COOLER GRATE PLATES
Filed July 16, 1965  2 Sheets-Sheet 2
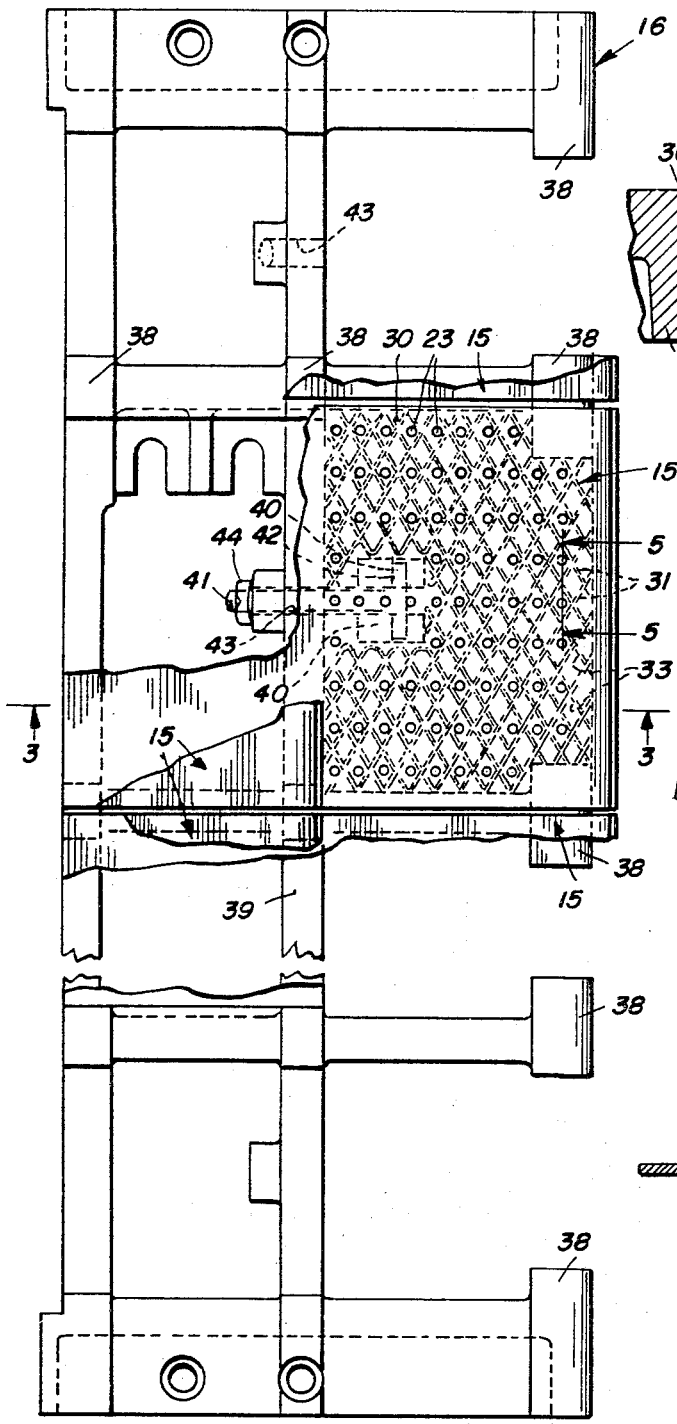
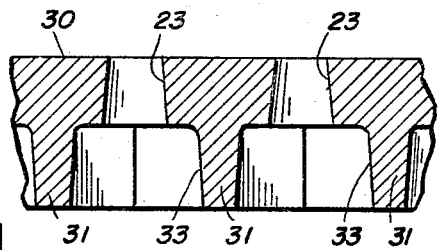
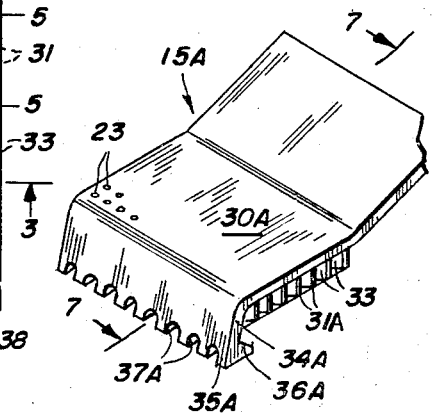
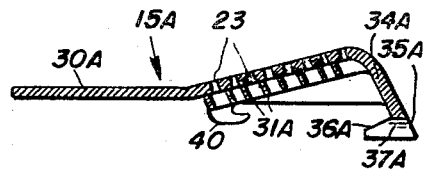
INVENTOR
WILLIAM J. GILLMAN
BY
*Mier L. Hartmann*
ATTORNEY

United States Patent Office 3,374,553
Patented Mar. 26, 1968

3,374,553
CLINKER COOLER GRATE PLATES
William J. Gillman, 15800 Rim Rock Road,
Apple Valley, Calif. 92307
Filed July 16, 1965, Ser. No. 472,631
4 Claims. (Cl. 34—164)

ABSTRACT OF THE DISCLOSURE

Grate plates for movable type cement clinker coolers having orifices spaced for effective distribution of cooling air, and an underneath grid structure to direct air to orifices and prevent warping of top surfaces of plates.

---

This invention relates to grate type air coolers for cement clinker and the like, and in particular to the overlapping horizontal grates, with fixed grates alternating with laterally movable reciprocating grates.

The grates of this invention are an improvement upon those described in Gaffney U.S. Patent No. 2,431,799, to which general reference is made as to the general structure of these coolers, and the operation of the grates in a cooler of this type.

The principal object of the invention is to provide grate plates for cement clinker coolers which are more efficient in cooling the clinker, and have longer life. Another object is to provide grate plates which do not buckle or become warped in use. Still another object is to provide means for producing more turbulence in the clinker which rests upon the grate plates. A further object is to provide better distribution of the cooling air which is blown through orifices in the grate plates. Another object is to provide increased cooling surface for the underside of the plates, to prevent overheating of the plates.

These and other objects are attained by my invention, which will be understood from the following description, reference being made to the accompanying drawings in which FIG. 1 is a side elevational view with parts broken away showing a portion of a grate type cement clinker cooler;

FIG. 2 is a fragmentary plan view, with parts broken away, of a typical grate plate support frame for holding a row of grate plates across the cooler, with grate plates of this invention mounted thereon;

FIG. 3 is a fragmentary cross-sectional view taken on the line 3—3 of FIG. 2;

FIG. 4 is a perspective view of a flat grate plate showing the underneath grid structure;

FIG. 5 is a fragmentary cross-sectional view taken on the line 5—5 of FIG. 2;

FIG. 6 is a perspective view of an alternative tapered form of grate plate; and

FIG. 7 is a longitudinal cross-sectional view taken on the line 7—7 of FIG. 6.

Referring to the drawings, a typical grate type cooler for cement clinker is represented generally at 11, and consists essentially of a rectangular housing 12 which is lined with a refractory lining and has mounted therein grate support frames 14 and 16, each of which holds a row of perforated grate plates extending across the housing 12. Alternate support members, 14, holding rows of grate plates 15, are stationary and the others, frames 16, also holding similar plates 15, are reciprocably movable, the grate plates being positioned in partly overlapping relation. The movement of the alternate support frames and the rows of grate plates is usually by means of a lever 17 and a crank arm 18 which is driven by a chain belt 19 from a motor 20. The movement of the plates is in the direction to alternately push the material on the plates of one row forwardly on to the plates of the next row of plates. Cooling air is introduced below the grate structure through air ducts, represented at 22, and passes upwardly through the perforations 23 in the grate plates and through the layer of clinker on the plates as will be more particularly described below. A belt conveyor 25 may be provided to collect the fine clinker which falls through the openings between plates and carry it to the discharge end of the cooler.

The throat 27 of the cooler receives the hot clinker from the rotary kiln (not shown), the retention plates 29 holding and initially cooling the clinker as described in Patent No. 3,170,775, to which general reference is made.

The improvement provided by this invention resides in the structure of the grate plates in the preferred flat form shown particularly in FIGS. 2, 3, 4 and 5, and in the alternative wedge form shown in FIGS. 6 and 7.

Each grate plate, represented generally as 15, consists of a rectangular cast alloy steel base 30 which is relatively thin, and has a smooth upper surface. The under side of the plate base 30 is provided over the forward part, with cooling and reinforcing ribs 31 preferably in the form of a grid disposed diagonally, thus forming a pattern of pockets 33 in the center of each of which is an air orifice 23 through the base 30. The forward edge of each base 30 is turned down to form a pusher 34, the front face of which extends angularly forward to provide a wedge-like plow 35 which scoops under the mass of clinker on the cooler plate below. This gives greater turbulence to the clinker material as it is pushed forward and over the air orifices 23, and thus gives more effective cooling.

Grooves 37 on the bottom surface of the pusher 34 are preferably provided so that cooling air may be blown out into the tumbling mass of cement clinker ahead of the pusher. The size of the groove openings may be selected to give the most efficient cooling action without too much loss of air or displacement of the pieces of clinker. The groove openings may be entirely eliminated, with some loss of cooling efficiency.

A wedge-shaped lug 36 may also be integrally formed on the back face of the pusher 34, this hook-like shaped pusher including said lug being adapted to hold the forward corners of the grate plates on the holding fingers 38 of the grate support frames 14 and 16.

Each grate plate 15 is provided on its under side with a pair of hook-like fastening members 40 spaced apart and adapted to receive the cross-arm 42 of a T-bolt 41 which is engaged in a hole 43 in the support frame 14 or 16 and secured thereto by a nut 44.

In the alternative form of my invention shown in FIGS. 6 and 7, the structure of the grate plates is similar to the above preferred form, and differs therefrom by having the forward half of the plate slope upwardly toward the front or pusher edge, the pusher being higher than in the flat form of FIG. 4. This wedge form of plate 15A is advantageous when the cooler is of the inclined grate type. In FIGS. 6 and 7 the plate base 30A is relatively thin and is provided on the forward (upwardly inclined) portion with cooling and reinforcing ribs 31 which are preferably arranged in the form of a grid disposed diagonally to the edges of the plates, thus forming pockets 33 in the center of each of which is an air orifice 23 through the base plate 30A. The forward edge of each base 30A is turned down to form a pusher 34A, the front face extending angularly forward to provide a wedge-like plow 35A which scoops under the mass of clinker on the plate below. As in the preferred form, there are grooves 37A on the bottom surface of the pusher 34A for carrying cooling air out into the mass of clinker ahead of the pusher 34A. A lug 36A is formed integrally on the back face of the pusher 34A, this hook-like shaped pusher including the said lug being adapted to hold the forward corners of the alternative grate plate 15A on the holding fingers 38 of the grate support frames 14 or 16. The alternative grate plates 15A are provided with hook-like fastening members 40 on the underside, adapted to receive the cross-arm of a T-bolt 41 whose bolt portion engages the support frames 14 or 16.

When the plates are secured to the support frames by the T-bolt 41, the rearward edges of the ribs 31 press against the forward bar 39 of the grate supports, 14 or 16, and when the bolts are tightened, the strain of the holding fingers 38 is relieved and the tips of these parts wear less and therefore have longer life.

While I have described particular embodiments of my invention in the preferred and alternative forms described above, my invention is not limited to these specific forms. The reinforcing and air cooling grid pattern of the underside of the grid plates may be varied within the limits of structure which provides the breaking up of the cooling air stream under the plates, so that all orifices receive cooling air, and the heat on the base surface is drawn down by the reinforcing structure so that the top surface of the grid plate does not become overheated. This avoids buckling of the plates, with the consequent loss of efficient cleaning of the plate with each reciprocation of the pusher on the plate above, and also the loss of cooling air through the openings caused by buckling.

The advantages set forth in the beginning have been attained by the structures described.

I claim:

1. A grate plate for a grate type cooler for cement clinker, said cooler having longitudinally overlapping plates on alternately fixed and movable support frames comprising a rectangular base having a smooth top surface extending upstream from a downstream edge, said base having circular orifices therethrough distributed over the downstream half-portion only of said base; an integral air cooled pusher member depending from said downstream edge, said pusher member having a plow-like front terminating in a foot which is adapted to slide on the non-orificed portion of an overlapped grate plate of similar structure; cooling and reinforcing members formed integrally on the under-face of said base in the portion adjacent said orifices; and means for removably fastening each of said grate plates to the grate support members only of said cooler; said pusher member being provided with passages disposed to discharge cooling air forwardly of said member.

2. The grate plate defined in claim 1 in which orifices for discharging cooling air ahead of said pusher are in the form of grooves in the foot of said pusher member, said grooves being disposed to discharge air forwardly of said pusher foot.

3. A grate plate for a grate type cooler having longitudinally overlapping plates mounted on alternately fixed and movable support frames comprising a rectangular base having a flat smooth top surface extending upstream from a downstream edge, said base having orifices therethrough distributed over the downstream half portion of said base; an integral pusher member depending from said downstream edge, said pusher member having a wedge-like front terminating in a foot which is adapted to slide on an overlapped grate plate of similar structure, said foot being provided with grooves for discharge of cooling air ahead of said wedge-like front; cooling and reinforcing ribs formed integrally on the under face of said base in the portion adjacent said orifices in said base, said ribs intersecting to form pockets at least some of which communicate with said orifices; and means for attaching said plate to the support frame.

4. The grate plate defined in claim 3, in which the said base slopes upwardly from its mid-portion to the downstream edge.

References Cited

UNITED STATES PATENTS

| 1,119,808 | 12/1914 | Coates | 110—74 |
| 1,527,940 | 2/1925 | Webster | 110—74 X |
| 2,033,570 | 3/1936 | Cruikshank | 110—74 X |
| 2,431,799 | 12/1947 | Gaffney | 34—164 |
| 2,806,439 | 9/1957 | Wagner | 126—175 X |
| 3,170,775 | 2/1965 | Howell | 34—164 |

FOREIGN PATENTS

| 250,885 | 4/1964 | Australia. |
| 568,164 | 1/1933 | Germany. |
| 920,028 | 11/1954 | Germany. |

FREDERICK L. MATTESON, Jr., *Primary Examiner.*

C. R. REMKE, H. B. RAMEY, *Assistant Examiners.*